March 16, 1965 M. C. CHUTZ 3,173,669
VEHICLE SPRING AND AXLE ASSEMBLY
Filed July 9, 1963 2 Sheets-Sheet 1

INVENTOR
Mac C. Chutz,

March 16, 1965 M. C. CHUTZ 3,173,669
VEHICLE SPRING AND AXLE ASSEMBLY
Filed July 9, 1963 2 Sheets-Sheet 2
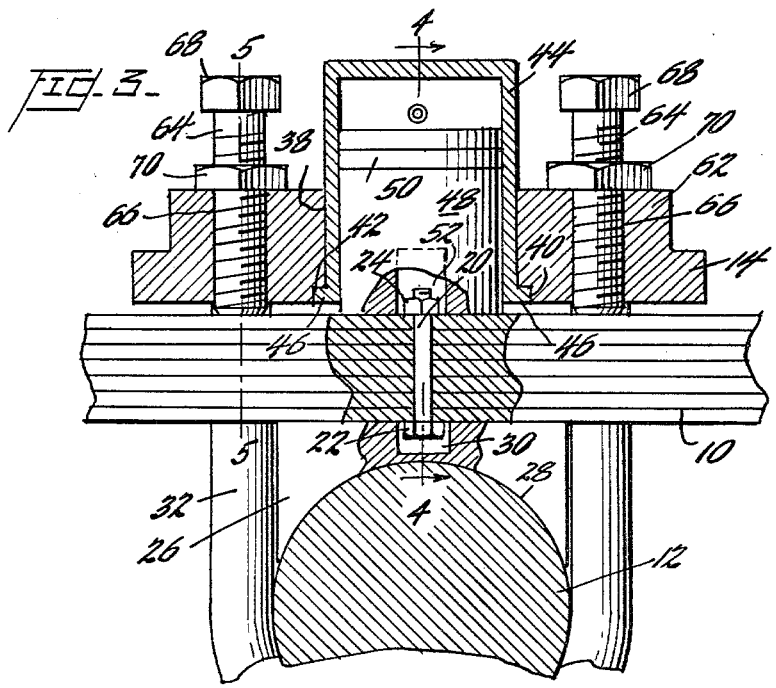
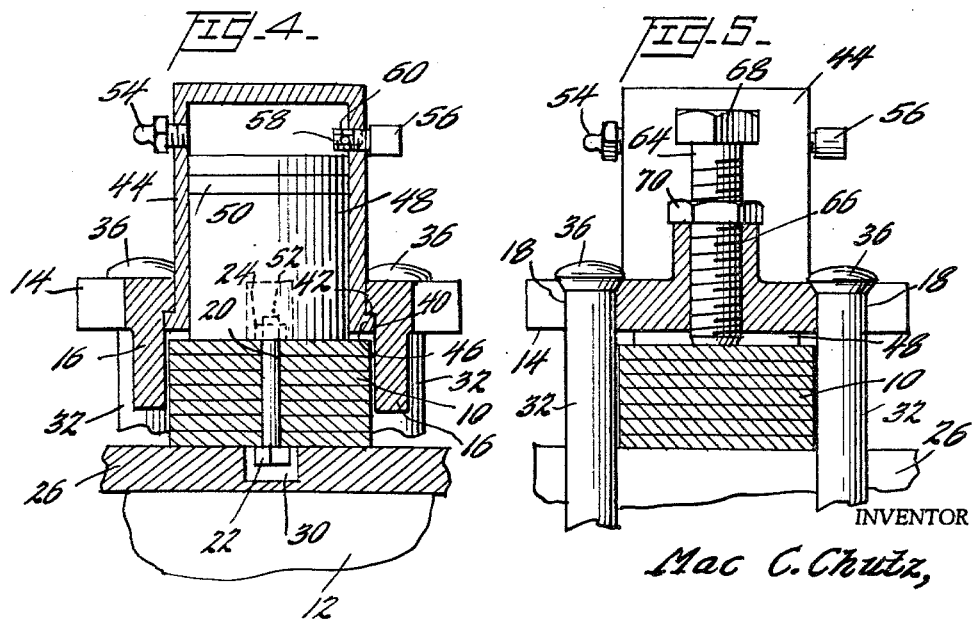
INVENTOR
Mac C. Chutz, United States Patent Office 3,173,669
Patented Mar. 16, 1965

3,173,669
VEHICLE SPRING AND AXLE ASSEMBLY
Mac C. Chutz, 467 New Castle St., Slippery Rock, Pa.
Filed July 9, 1963, Ser. No. 293,651
11 Claims. (Cl. 267—52)

The present invention relates generally to the motor vehicle art and is particularly concerned with relatively heavy vehicles of the truck or trailer type.

More particularly, the invention relates to improved apparatus for attaching a semi-elliptical leaf type spring to the axle or frame of such a vehicle or for tightening such a spring and axle assembly which may have become loosened in operation.

In accordance with one conventional practice in the art, a typical spring and axle assembly includes one or more U-bolts having their bight portion surrounding the axle and their end portions secured to a plate in such manner that the spring and axle are clamped together between the U-bolts and the plate. Typical examples of such assemblies are illustrated in such patents as Konetsky No. 2,077,048, Rossman No. 2,157,499 and Douglass No. 2,678,819. As shown in each of these patents, and as has been the universal practice in the art, the clamping action between the U-bolts and the spring plate which serves to hold the spring and axle together is achieved by providing the necessary number of holes in the spring plate through which the threaded ends of the U-bolts may be forced in such manner that the assembly may be secured together and tightened by means of a plurality of nuts in engagement with the threaded ends of the U-bolts and bearing against the spring plate.

Assemblies of the type just described generally present some difficulties and disadvantages. For example, when the assemblies become loosened through normal wear, each of the nuts must be individually tightened on the U-bolts and in many cases such as where the threads have become worn, the entire assembly must be replaced. In the case of heavy trucks and trailers, the replacement of a single spring may require as much as three or four man hours of labor. By way of contrast, the replacement of a single spring in accordance with the present invention takes one man only about four minutes.

Another drawback of assemblies of this type known to the prior art resides in the inherent expense of the necessary components. In particular, it will be noted that the U-bolts must be threaded to receive the retaining nuts and in truck sizes such U-bolts generally cost around $7.00 or $8.00 each. Again by way of contrast, the U-bolts in accordance with the present invention having enlarged ends formed by upsetting may be purchased for as little as 60¢ each. It will be readily apparent, therefore, that the present invention affords tremendous advantages from the economic standpoint alone and this is a matter of considerable importance to the trucking industry which generally employs fleets of vehicles under common ownership and maintenance.

It is accordingly a principal object of the present invention to provide improved apparatus for attaching a leaf type spring to an automotive vehicle axle especially in vehicles of the heavy truck or trailer type.

Another object of the invention is to provide improved apparatus of the type described which may be produced at but a fraction of the cost of conventional apparatus of the same general type heretofore known in the art and which may be employed both in initial assembly and in maintenance with greatly reduced labor costs.

A further object of the invention is to provide improved apparatus of the type described including a spring clamping plate of novel construction which is still capable of use with conventional threaded U-bolts of the type presently in common use.

An important object of the invention is to provide a spring and axle assembly of the type described wherein the clamping action between the U-bolts and the spring plate is effected by means of a fluid pressure operated servo motor capable of utilizing conventional and substantially universally available sources of fluid pressure.

An additional object of the invention is to provide improved apparatus of the type described in which production costs may be still further reduced by utilization of a single standard size servo motor in conjunction with spring plates of various sizes capable of accommodating different sized springs.

The foregoing together with other and further objects and advantages of the present invention will become more readily apparent to those skilled in the art from a consideration of the following more detailed specification taken in conjunction with the accompanying figures of the drawing in which:

FIGURE 3 is a longitudinal cross-sectional view through the spring and axle assembly taken substantially along the line 3—3 of FIGURE 2;

FIGURE 4 is a transverse cross-sectional view through a portion of the spring and axle assembly taken substantially along the line 4—4 of FIGURE 3; and FIGURE 5 is a transverse cross-sectional view through a portion of the assembly taken substantially along the line 5—5 of FIGURE 3.

Figure 1:
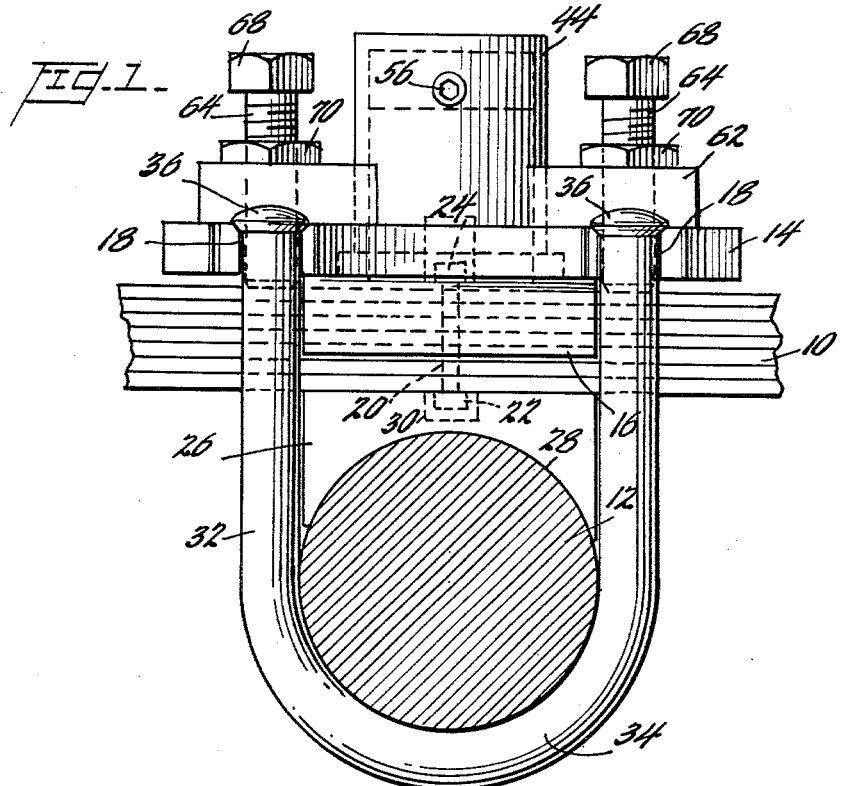
FIGURE 1 is a side elevational view illustrating a preferred embodiment of spring and axle assembly in accordance with the present invention, the showing being fragmentary as to both the spring and the axle.

Referring now in somewhat greater detail to the various figures of the drawing, the preferred embodiment selected for the purpose of illustration is shown in FIGURE 1 in conjunction with a portion of a typical truck spring 10 and axle 12. Since the details of the spring and axle per se do not form a part of the present invention, only fragments thereof have been illustrated throughout the several views. However, it will be understood that the spring 10 is of the conventional multiple leaf, semi-elliptical type having its ends (not shown) attached to the vehicle body by means of the usual spring shackles or other fittings. In like manner, the axle 12 will be understood to carry at its outer ends the usual wheels or other running gear for the vehicle. As illustrated in the drawings, the spring 10 is mounted above the axle 12 although the relative positions of these parts may be reversed under certain circumstances for reasons not pertinent to the present invention.

Figure 2:
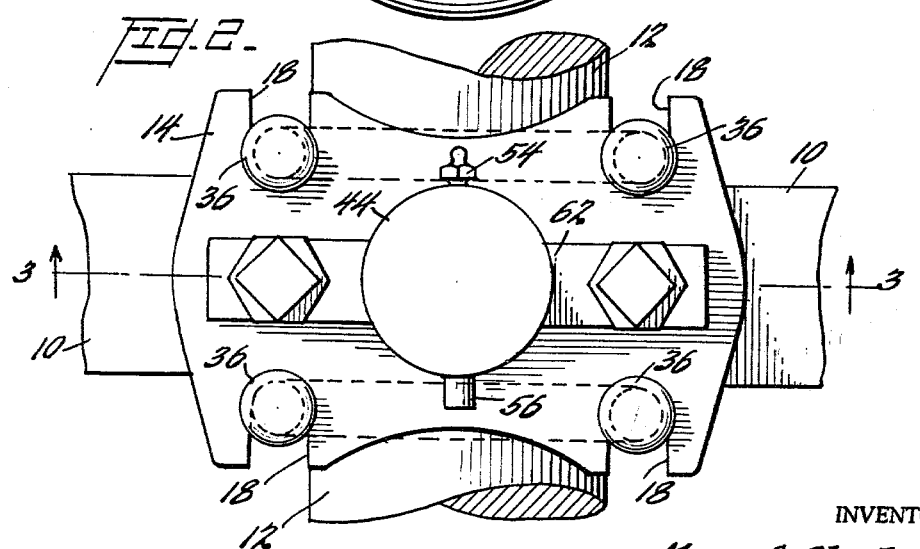
FIGURE 2 is a top plan view of the spring and axle assembly illustrated in FIGURE 1.

The apparatus for connecting together the spring 10 and axle 12, as best shown in FIGURE 2, is seen to comprise a generally flat rectangular plate 14 having a pair of depending parallel flanges or gussets 16 (FIG. 4) extending downwardly along its outer longer edges. The plate or member 14 is also provided with oppositely disposed pairs of slots 18 which preferably open outwardly in the opposite longer edges of the plate 14. In the embodiment illustrated, the plate 14, at the start of assembly of the apparatus, is adapted to engage the top or upper surface of the spring 10 while the flanges 16 rather loosely engage the opposite sides of the spring 10 thus serving to align the parts at the beginning of assembly. In accordance with conventional practice, the individual leaves of the spring 10 may be held together by means of a bolt 20 having a head 22 and a nut 24.

Still referring to FIGURE 1 and also to FIGURE 3 of the drawings, the lower face of the spring 10 is seen to rest upon the flat upper surface of a saddle block 26 which is preferably of substantially the same width as the diameter of the axle 12 and may be of any desired length. The lower surface 28 of the saddle block 26 is curved in such manner as to form a bottom face adapted to rest upon the upper curved portion of the axle 12 immediately beneath the spring 10. In order to accommodate the head 22 of the bolt 20, the saddle block 26 is also preferably provided with a small recess 30 located centrally thereof.

As best illustrated in FIGURES 1 and 2, the axle 12, saddle block 26 and spring 10 are clamped to the plate 14 by means of tensioning devices in the form of a pair of U-bolts 32 having their bight portions 34 surrounding the lower portion of the axle 12 and having their upper ends received in the slots 18. While the diameter of the U-bolts 32 is slightly smaller than the width of the slots 18 so that the U-bolts may be readily slid into the slots in a lateral or sideways movement, the upper ends of the U-bolts 32 are enlarged as by being upset during manufacture to form rivet like heads 36 which are larger than the width of the slots 18 and thereby serve to prevent movement of the U-bolts in the downward or vertical sense after assembly.

Referring to FIGURE 3, the plate 14 is provided with a through bore or aperture 38 extending through its center portion and having a counter bore 40 in its lower face forming a shoulder 42 therein. A cylinder 44, preferably formed as an extrusion, is mounted as by means of a press fit within the aperture 38 and is provided with a flange 46 around its lower open end adapted to engage the shoulder 42 so as to prevent upward movement of the cylinder relative to the plate 14. As shown throughout the several views, the outer or upper end of the cylinder 44 is closed and a piston 48 is slidably mounted within the cylinder 44 in such manner that its inner or bottom end may extend outwardly through the open end of the cylinder. The piston 48 is also preferably provided with a sealing member 50 to provide a pressure tight relationship between the cylinder and piston and also includes a cavity 52 centrally located in its bottom end to accommodate the threaded end of the bolt 20 and its associated nut 24.

From the description thus far, it will be apparent that the cylinder 44 and its associated piston 48 constitutes a fluid pressure servo motor so that, upon the admission of fluid under pressure to the space between the top of the piston and the closed upper end of the cylinder, the lower end of the piston will be forced against the top surface of the spring 10. In the particular embodiment of the invention illustrated in the drawings, the pressure fluid employed is a conventional lubricating grease which is widely available at most service stations and maintenance facilities. The admission of the pressure fluid or grease to the working chamber of the cylinder 44 is effected through a conventional valved grease fitting 54 of the type commonly employed for the lubrication of substantially all motor vehicles and sold under various trade names such as the well known "Alemite" fittings. Since these fittings are so well known in the art, no specific description is deemed necessary other than to note that they are designed to be received within the pressure fitting of the conventional "grease gun" and include one way valve structure permitting the flow of lubricant under pressure only from the exterior to the interior of the fitting. In order to relieve pressure or suction within the working chamber of the cylinder 44 during assembly or disassembly, there is also preferably provided a manually operable release valve 56 located in a suitable threaded bore within the cylinder wall opposite the pressure fitting 54. While the pressure relief valve 56 may take any of a variety of well known forms, as shown in FIGURE 4, it is seen to consist of a threaded plug having a knurled head and a longitudinal channel or blind hole 58 opening at the inner end of the plug and also opening into a transverse hole 60 which is so located as to lie entirely within the working chamber of the cylinder when the plug 56 is threaded into its limit position and to form a passage for the release of pressure when the plug 56 is unscrewed so that the transverse hole 60 lies exteriorly of the outer wall of the cylinder 44. It will be noted that both the pressure relief fitting 56 and the valved fitting 54 are mounted in the side walls of the cylinder 44 in order to minimize the likelihood of breakage or damage while in position on a vehicle.

In addition to the depending gussets or flanges 16 which serve both to aid in locating the spring assembly and to strengthen the plate 14, the latter may also be provided with a boss 62, preferably formed integrally therewith and extending upwardly along the center portion thereof. Additional means for stabilizing the assembly after installation may also be provided in the form of a pair of set screws 64 having their threads in engagement with similarly threaded holes 66 extending through the boss 62 and the lower portion of the plate 14. After the assembly has been installed in a manner to be described below, the set screws 64 may be turned by means of their heads 68 in such manner as to bring their inner ends into engagement with the top surface of the spring 10 and the set screws may be held in place by means of suitable lock nuts 70. It is to be particularly noted that the set screws 64 serve principally as stabilizing or retaining devices and are not employed in the initial stages of securing the apparatus together.

While it is believed that the operation of the device will be largely apparent from the foregoing description, it may be briefly described from the standpoint of an original installation. As previously mentioned, the various leaves of the spring 10 are usually held together by means of a bolt such as the through bolt 20 so that, after the saddle block 26 has been placed in position on top of the axle 12, the spring 10 may be placed upon the saddle block 26 and the spring plate or clamping plate 14 may then be placed in engagement with the upper surface of the spring 10 above the saddle block 26. At this time both of the set screws 68 are retracted out of engagement with the spring 10 and the piston 48 is similarly retracted within the cylinder 44. The U-bolts 32 may then be placed in position with their bight portions surrounding the lower curved portion of the axle 12 and the upper ends of the U-bolts may then be moved laterally into engagement with the slots 18. It will be understood that in this position the U-bolts 32 may not be withdrawn downwardly through the slots 18 by reason of the engagement of the enlarged heads 36 with the upper surface of the plate 14 adjacent the edges of the slots. With the parts in this position, a conventional pressurized grease gun is connected with the fitting 54 and pressure fluid is admitted into the working chamber of the cylinder 44 above the piston 48. The pressure fluid within the cylinder 44, the relief valve or plug 56 being closed, then causes the piston 48 to be forced downwardly through the open end of the cylinder 44 and into engagement with the top surface of the spring 10. This action causes the entire plate 14 and cylinder 44 to be forced relatively upwardly thereby placing the U-bolts 32 under tension and causing the spring 10, axle 12 and saddle block 26 to be firmly secured together. The set screws 64 may then be set up and locked in place to stabilize the assembly.

Although the operation of the device has been described from the standpoint of an original installation, it will be readily apparent that the same advantages accrue both in replacement and in routine maintenance. For example, where routine maintenance discloses the need for tightening the spring and axle assembly, it is only necessary to re-apply pressure fluid through the fitting 54 from a conventional source of lubricant under pressure. Furthermore, in addition to the substantially lower cost of U-bolts manufactured in accordance with the present invention as compared with the threaded U-bolts known to the prior art, the ease of assembling such U-bolts into slots rather than threaded holes is very marked as compared with prior practices. It will also be noted that a standard size cylinder 44 may be used with a number of plates 14 of different sizes so as to accommodate springs of varying dimensions thereby making possible the use of a single standardized size cylinder.

While I have illustrated and described herein a preferred embodiment solely for the purpose of illustration, it will be apparent that numerous modifications, alterations and deviations will occur to those skilled in the art without departing from the spirit or scope of the invention as set forth in the following claims.

I claim:

1. In an automotive vehicle having an axle carrying the running gear therefor and a semi-elliptical leaf spring attached to the body thereof, apparatus for interconnecting said axle and said spring comprising a generally flat, rectangular plate having depending parallel flanges along its outer, longer edges and oppositely disposed pairs of slots adjacent the ends of said plate opening outwardly in said longer edges, said plate and flanges engaging the top and sides respectively of said spring, a saddle block having a curved bottom face resting upon the upper curved portion of said axle beneath said spring, a pair of U-bolts surrounding the lower portion of said axle and having their upper ends received in said slots, said U-bolts having enlarged upset ends releasably engaging the upper surface of said plate adjacent the edges of said slots, said plate having a circular aperture through its center portion provided with a counterbore in its lower face forming a shoulder, a cylinder mounted in said aperture having a closed upper end and a flange around its open lower end in supporting engagement with said shoulder, a piston slidable in pressure tight relation within said cylinder and having its bottom end engaging the top of said spring, and a fluid pressure fitting adjacent the top of said cylinder whereby upon the admission of pressure fluid said spring and said axle will be firmly secured together and retained in interconnected condition.

2. In a vehicle having an axle and a leaf spring attached to the body thereof, apparatus for interconnecting said axle and said spring comprising a generally flat plate having depending parallel flanges along its outer, longer edges and oppositely disposed pairs of slots adjacent the ends of said plate opening outwardly in said longer edges, said plate and flanges engaging the top and sides respectively of said spring, a saddle block having a bottom face resting upon the upper portion of said axle beneath said spring, a pair of U-bolts surrounding the lower portion of said axle and having their upper ends received in said slots, said U-bolts having enlarged ends releasably engaging the upper surface of said plate adjacent the edges of said slots, said plate having a circular aperture through its center portion, a cylinder mounted in said aperture having a closed upper end and an open lower end, a piston slidable in pressure tight relation within said cylinder and having its bottom end extending through said aperture and engaging the top of said spring, and a fluid pressure fitting adjacent the top of said cylinder whereby upon the admission of pressure fluid said spring and said axle will be firmly secured together and retained in interconnected condition.

3. In a vehicle having an axle and a spring, apparatus for interconnecting said axle and said spring comprising a generally flat plate having oppositely disposed pairs of slots adjacent the ends of said plate opening outwardly in its longer edges, said plate engaging the top of said spring, a saddle block having a bottom face resting upon the upper portion of said axle beneath said spring, a pair of U-bolts surrounding the lower portion of said axle and having their upper ends received in said slots, said U-bolts having enlarged ends engaging the upper surface of said plate adjacent the edges of said slots, said plate having a circular aperture through its center portion, a cylinder mounted in said aperture having a closed upper end and an open lower end, a piston slidable in pressure tight relation within said cylinder and having its bottom end extending through said aperture and engaging the top of said spring, and a fluid pressure fitting adjacent the top of said cylinder whereby upon the admission of pressure fluid said spring and said axle will be firmly secured together and retained in interconnected condition.

4. In a vehicle having an axle and a spring, apparatus for interconnecting said axle and said spring comprising a plate having oppositely disposed pairs of slots adjacent the ends thereof opening outwardly in its longer edges, said plate engaging the top of said spring, a pair of U-bolts surrounding the lower portion of said axle and having their upper ends received in said slots, said U-bolts having enlarged ends engaging said plate adjacent the edges of said slots, said plate having a circular aperture through its center portion, a cylinder mounted in said aperture having a closed upper end and an open lower end, a piston slidable in pressure tight relation within said cylinder and having its bottom end extending through said aperture and engaging the top of said spring, and a fluid pressure fitting adjacent the top of said cylinder whereby upon the admission of pressure fluid said spring and said axle will be firmly secured together and retained in interconnected condition.

5. Apparatus for securing together a vehicle spring and axle comprising, a plate having oppositely disposed pairs of slots opening outwardly in a pair of opposite edges thereof, said plate engaging one face of said spring when in operative position, a pair of U-bolts having their bight portions engaging said axle and their end portions engaging said slots when in operative position, said plate having an aperture extending therethrough, a cylinder mounted in said aperture having a closed outer end and an open inner end, a piston slidable in pressure tight relation within said cylinder and having its outer end extending through said aperture and engaging said one face of said spring when in operative position, and a fluid pressure fitting adjacent the outer end of said cylinder whereby upon the admission of pressure fluid said spring and said axle will be firmly secured together and retained in interconnected condition.

6. Apparatus for securing together a vehicle spring and axle comprising, a plate having oppositely disposed pairs of slots opening outwardly in a pair of opposite edges thereof, said plate engaging one face of said spring when in operative position, a pair of U-bolts having their bight portions engaging said axle and their end portions engaging said slots when in operative position, a cylinder attached to said plate and having a closed outer end and an open inner end, a piston slidable in pressure tight relation within said cylinder and having its outer end engaging said one face of said spring when in operative position, and a fluid pressure fitting adjacent the outer end of said cylinder whereby upon the admission of pressure fluid said spring and said axle will be firmly secured together and retained in interconnected condition.

7. Apparatus for securing together a vehicle spring and axle comprising a plate having oppositely disposed pairs of slots opening outwardly in a pair of opposite edges thereof, said plate engaging one face of said spring when in operative position, a pair of U-bolts having their bight portions engaging said axle and their end portions engaging said slots, a fluid pressure actuated servo motor attached to said plate applying force against said one face of said spring when in operative position, and means for applying fluid under pressure to said servo motor whereby said spring and said axle will be firmly secured together and retained in interconnected condition.

8. Apparatus for securing together a vehicle spring and axle comprising, a member engaging one face of said spring when in operative position, a pair of U-bolts having their bight portions engageable with said axle and their end portions engaging said member and encompassing both spring and axle when in operative position, a fluid pressure actuated servo motor attached to said member and applying force against said one face of said spring when in operative position, and means for applying fluid under pressure to said servo motor whereby said spring and said axle will be firmly secured together and retained in interconnected condition.

9. Apparatus for securing together a vehicle spring and axle comprising, a generally flat plate having oppositely disposed pairs of slots opening outwardly in a pair of opposite edges thereof, said plate engaging the top surface of said spring when in operative position, a pair of U-bolts surrounding the lower portion of said axle and having their ends received in said slots when in operative position, said U-bolts having enlarged upset ends releasably engaging the upper surface of said plate adjacent the edges of said slots, and means mounted on said plate operable to apply a separating force between the latter and said spring whereby to place said U-bolts under tension to secure said spring and said axle in firmly interconnected condition.

10. Apparatus for securing together a vehicle spring and axle comprising, a generally flat plate having oppositely disposed pairs of slots adjacent a pair of opposite edges thereof, said plate engaging said spring when in operative position, a pair of U-bolts surrounding said axle and having their ends received in said slots when in operative position, said U-bolts having enlarged upset ends releasably engaging the surface of said plate adjacent the edges of said slots, and means mounted on said plate operable to apply a separating force between the latter and said spring whereby to place said U-bolts under tension to secure said spring and said axle in firmly interconnected condition.

11. Apparatus for securing together a vehicle spring and axle comprising, a member engaging said spring and having oppositely disposed pairs of slots adjacent a pair of opposite edges thereof, a pair of U-bolts surrounding said axle and having their ends received in said slots when in operative position, said U-bolts having enlarged upset ends releasably engaging said member, and means mounted on said member operable to apply a separating force between the latter and said spring, whereby to place said U-bolts under tension to secure said spring and said axle in firmly interconnected condition.

References Cited by the Examiner
UNITED STATES PATENTS

| | | | |
|---|---|---|---|
| 980,138 | 12/10 | Bancroft | 267—31 |
| 1,043,677 | 11/12 | Davis | 267—31 |
| 2,280,347 | 4/42 | Olley et al. | 267—52 |
| 3,058,740 | 10/62 | Harbers et al. | 267—52 |

FOREIGN PATENTS

| | | |
|---|---|---|
| 452,059 | 8/36 | Great Britain. |

ARTHUR L. LA POINT, *Primary Examiner.*